Aug. 17, 1926.

F. T. WALTON 1,596,263

CIRCUIT CONTROL APPARATUS

Filed May 5, 1924    3 Sheets-Sheet 1

Inventor
Freeman T. Walton.

By James E. Sproll
Attorney

Aug. 17, 1926.
F. T. WALTON
1,596,263
CIRCUIT CONTROL APPARATUS
Filed May 5, 1924   3 Sheets-Sheet 2
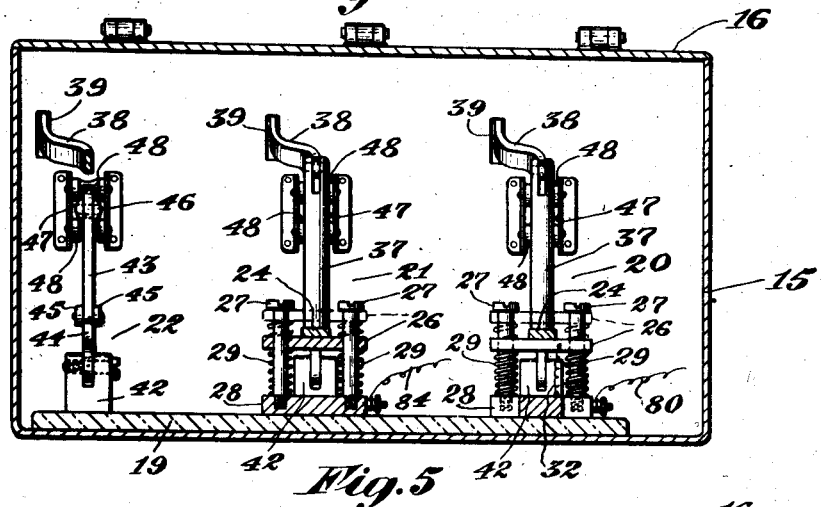
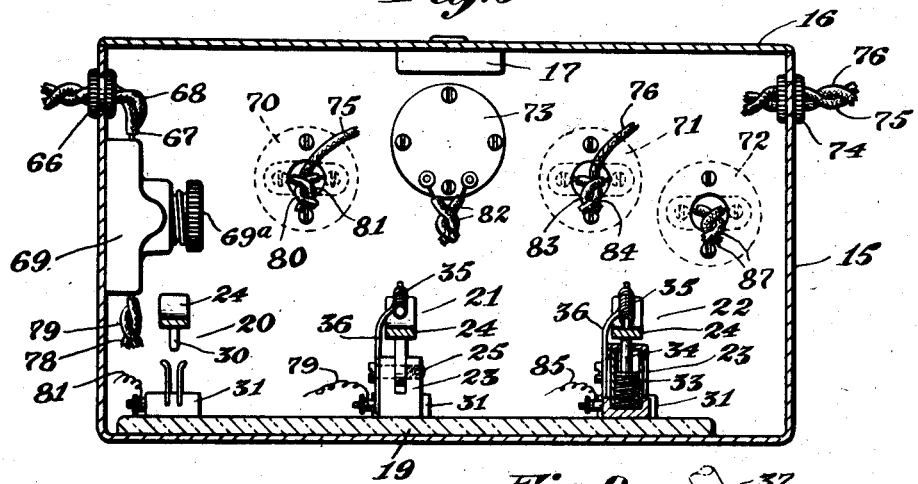
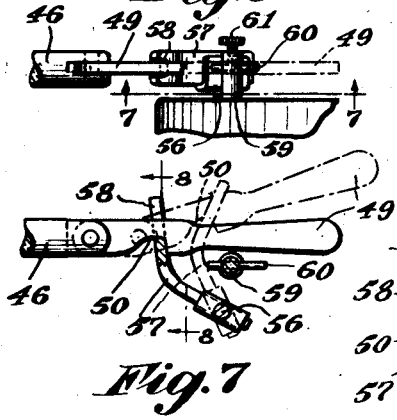
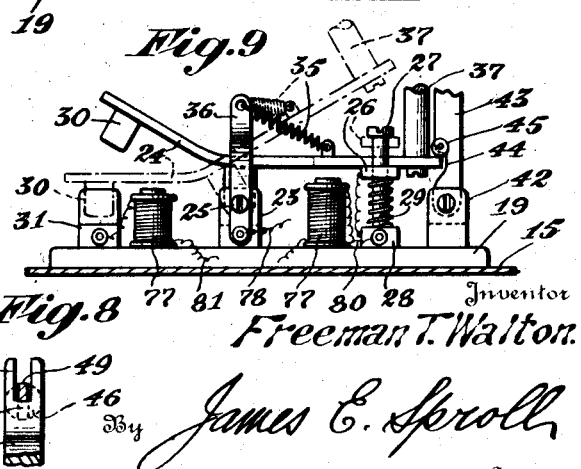

Aug. 17, 1926.
F. T. WALTON
1,596,263
CIRCUIT CONTROL APPARATUS
Filed May 5, 1924   3 Sheets-Sheet 3
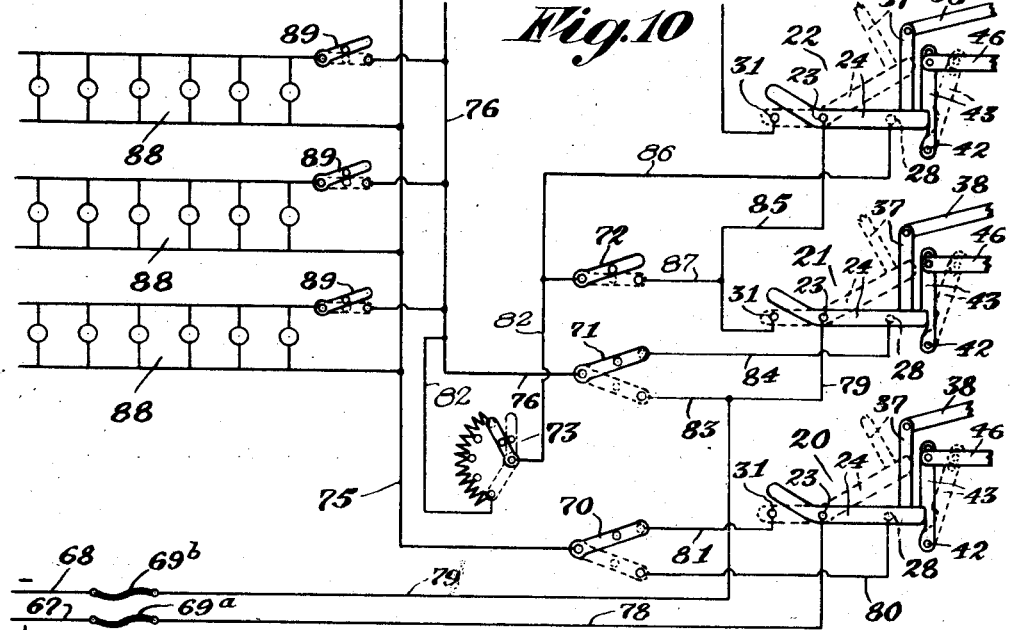
*Fig. 10*
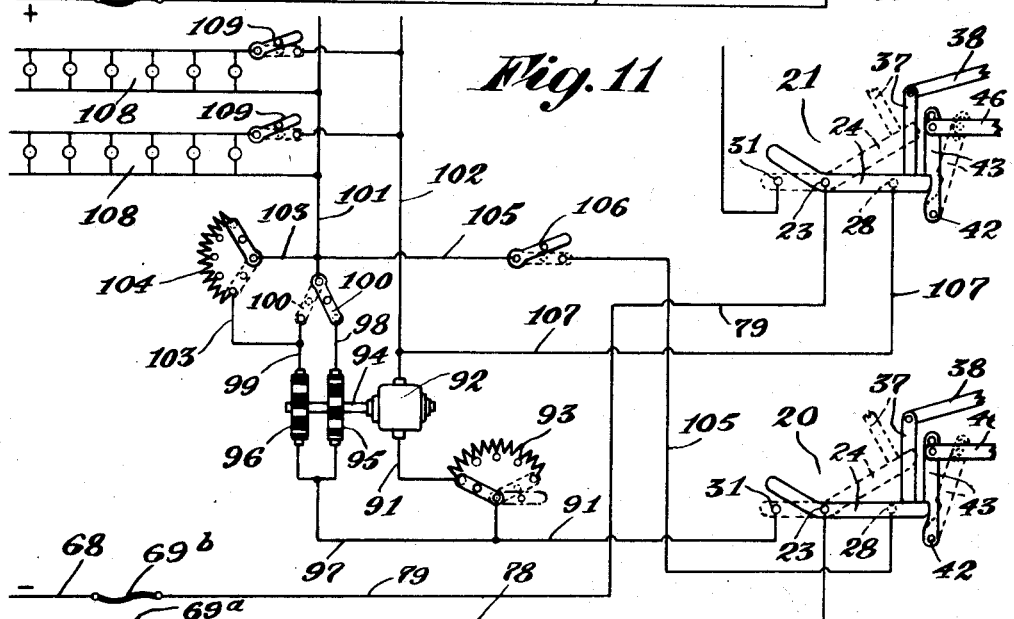
*Fig. 11*
*Fig. 12*
Inventor
Freeman T. Walton.
By James E. Sproll
Attorney Patented Aug. 17, 1926.

1,596,263

UNITED STATES PATENT OFFICE.

FREEMAN T. WALTON, OF SEATTLE, WASHINGTON.

CIRCUIT-CONTROL APPARATUS.

Application filed May 5, 1924. Serial No. 711,192.

The primary aim and fundamental object of the present invention is the provision of a circuit control apparatus designed to be manually set to predeterminately close and open a plurality of circuits, whereby lamps, motors or other electrical appliances interposed in said circuits may be automatically controlled and regulated to function and to cease to function at predetermined and selected intervals without any manual actuation whatsoever subsequent to the periodic manual setting thereof.

With these ends in view the invention is concerned primarily in the provision of a circuit control apparatus for a lamp, motor or other electrical appliance circuit, designed to automatically and predeterminately close and energize said circuit with the full line load or pressure for a predetermined period and at the termination thereof to automatically and predeterminately cut-in a resistance in said circuit whereby the line load or pressure therein is predeterminately and selectively reduced for a predetermined period and at the termination thereof to automatically and predeterminately open and de-energize the said circuit.

The invention further consists in the provision of a circuit control apparatus for an electric circuit, wherein said circuit may be either manually or automatically and predeterminately closed and energized with the full line load or pressure for a predetermined period and at the termination thereof said line load or pressure is predeterminately reduced to a selected and desired pressure for a predetermined period and at the termination thereof said circuit may be either automatically and predeterminately or manually opened and de-energized.

The invention further consists in the provision of a circuit control apparatus embodying appliances or mechanisms whereby the offices of the above mentioned agencies are adjustably regulated to predeterminately control their respective actions.

With the foregoing in view the invention resides in the novel construction, combination, adaptation and arrangement of parts, as will hereinafter be more fully described and succinctly defined in the appended claims.

Referring now to the accompanying drawings wherein is illustrated the specific form of the invention, as at present preferred:—

Fig. 4 is a transverse vertical section taken through 4—4 of Fig. 1.

Fig. 5 is a similar section taken through 5—5 of Fig. 1.

Fig. 6 is a fragmentary plan view of the trip mechanism for the bus bar switches.

Fig. 7 is a fragmentary longitudinal vertical section taken through 7—7 of Fig. 6.

Fig. 8 is a fragmentary transverse vertical section taken through 8—8 of Fig. 7.

Fig. 9 is a fragmentary view in elevation of a slightly modified form of bus bar switch.

Fig. 10 is a diagrammatic view of the several circuits of the apparatus having a plurality of lamp circuits connected therewith, in parallel and for control thereby.

Fig. 11 is a similar view of a slightly modified form of the several circuits of the apparatus having a flasher circuit connected therewith and a plurality of flashing lamp circuits connected therewith, in parallel for control by said apparatus and said flasher circuit, and Fig. 12 is a fragmentary diagrammatic view of the circuit or wiring of the bus bar switch illustrated in Fig. 9.

Figure 1:
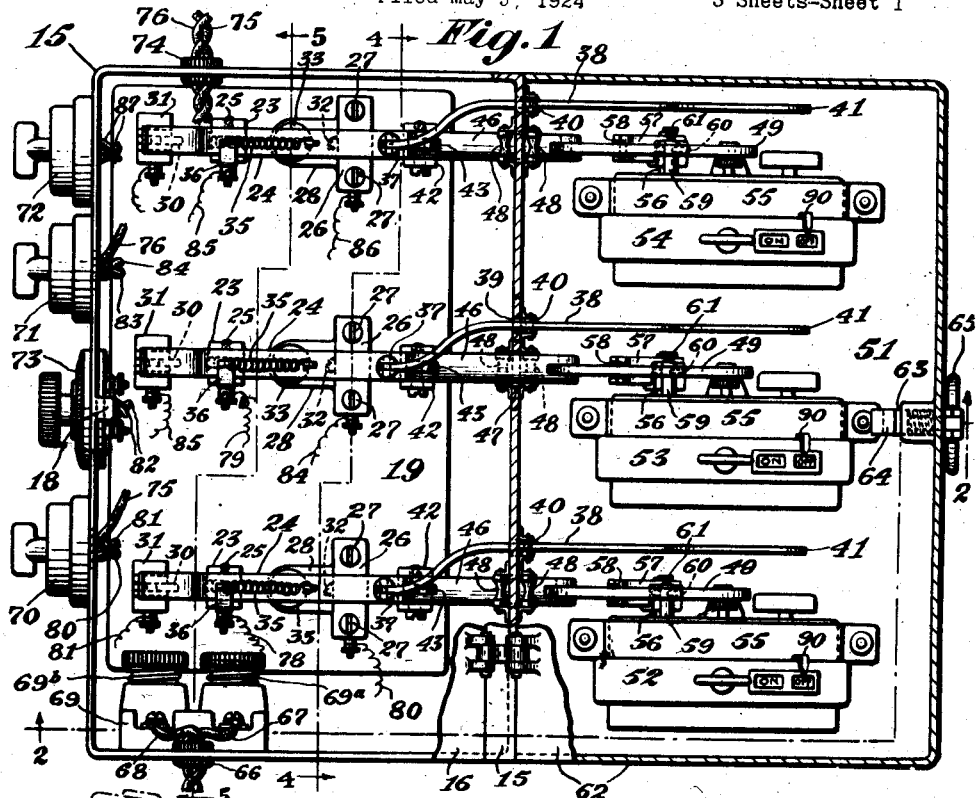
Figure 1 is a plan view of a circuit control apparatus fabricated in accordance with the invention, having the several bus bar switches thereof illustrated in a locked position and having certain parts shown in section and certain other parts broken away or omitted for clearness of illustration.

In the accompanying drawings and in the following description I have elected to illustrate and describe the invention as embodied in a triple bus bar switch apparatus, but, manifestly the invention may be embodied in an apparatus having one or any number of bus bar switches and associated actuating mechanisms without departing from the spirit of the invention or the benefits derivable therefrom the present showing being merely by way of illustration, and inasmuch as the bus bar switches and associated actuating mechanisms are identical in construction, a description of one will suffice for all.

Referring now to the accompanying drawings wherein like reference characters designate like parts throughout the several views, the numeral 15 designates a casing provided at the upper open end thereof with a hingedly connected cover 16 having a lock 17 secured thereto adapted to restrainingly engage a lug 18 secured upon said casing.

Disposed within the casing 15 and rigidly secured, in any well known manner, to the bottom wall thereof is a block or base 19 of insulating material and mounted upon said block in fixed and spaced parallel relation are a plurality of bus bar switches 20, 21 and 22, respectively Fig. 4, which are identical in construction and comprise fixed central bifurcated posts 23 having longitudinally disposed bus bars 24 pivotally connected thereto, as at 25, adapted to contact adjacent the forward terminals thereof with transversely disposed spring pressed conductive bars 26 slidably mounted upon vertically disposed guide pins 27 rigidly secured at the lower ends thereof, in spaced relation, to base plates 28, of conductive material, similarly secured to the block 19 in longitudinal alignment with the fixed central posts 23 and in spaced relation thereto.

Figure 2:
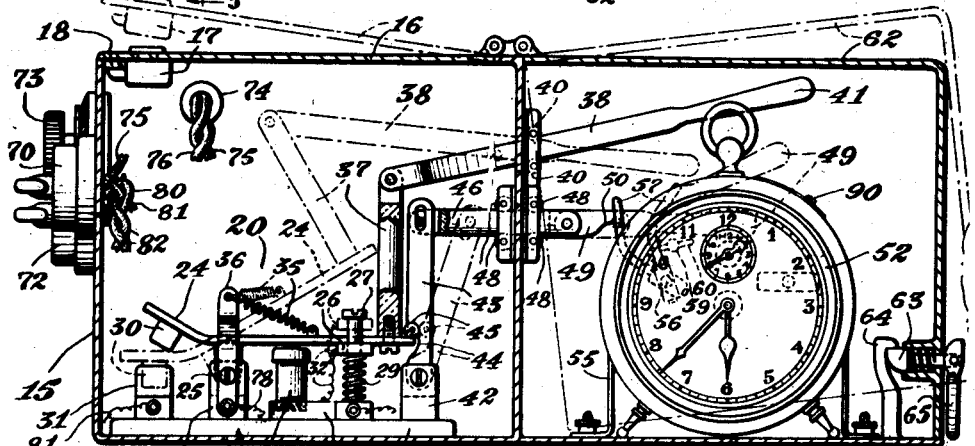
Fig. 2 is longitudinal vertical section taken through 2—2 of Fig. 1, with certain parts broken away and shown in section.
Figure 3:
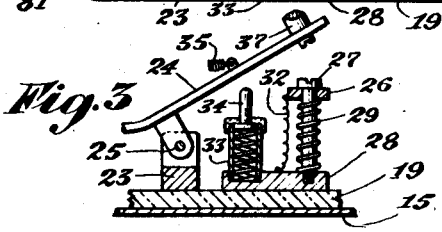
Fig. 3 is a fragmentary medial longitudinal section of one of the bus bar switches of the apparatus illustrated in a tripped position.

Helical springs 29 mounted upon the guide pins 27 and interposed between the bars 26 and the base plates 28 serve to return the bars 26 to the elevated positions indicated in dot and dash lines in Fig. 2, and in full lines in Fig. 3, when the bus bars 24 are out of contact with the bars 26 as indicated in dot and dash lines Fig. 2 and in full lines in Fig. 3.

The opposite or rear terminal portions of the bus bars 24 are provided upon the undersides thereof with downwardly extending integral blade elements 30 adapted to engage and contact with forked conductive posts 31 rigidly secured to the block 19 in longitudinal alignment with the fixed central posts 23 and in spaced relation thereto upon the opposite sides thereof to that of the mounting of the base plates 28. The bus bars 24 are adapted to alternately contact with the spring pressed conductive bars 26 and the fixed conductive forked posts 31, as indicated in full lines and in dot and dash lines in Fig. 2.

Shunt wires 32 connect the spring pressed conductive bars 26 with the base plates 28, whereby a positive and direct connection of sufficient capacity is established therebetween, and loss of energy is prevented due to the relatively loose connections between the bars 26, the guide pins 27 and the associated helical springs 29, as will be readily apparent.

Interposed between the fixed central posts 23 and the bars 26 in longitudinal alignment therewith and rigidly secured upon the base plates 28 are casings 33, of conductive material, having slidably disposed therein and projecting therefrom spring pressed conductive pins 34 adapted to make contact with the underside of the bus bars 24 prior to the making of contact between the latter and the spring pressed bars 26, and to break contact with said bus bars 24 subsequent to the breaking of contact between the latter and the said spring pressed bars 26, to thereby prevent arcing or flashing when contact is made or broken between the bus bars 24 and the spring pressed bars 26.

Tension springs 35 connected at the forward ends to the bus bars 24 and at the rear ends thereof to the upper ends of upwardly extending arcuate arms 36 rigidly secured upon the sides of the fixed central posts 23 serve in conjunction with the spring pressed bars 26 and the spring pressed pins 34 to facilitate and expedite the breaking of contact between the bus bars 24 and the spring pressed bars 26 and the making and maintaining of contact between the blade elements 30 and the forked conductive posts 31, as will be manifest by referring to Figs. 2 and 3.

Rigidly secured to the upper side of the bus bars 24 adjacent the forward terminals thereof and in perpendicular relation thereto are rods or stems 37, of insulating material, having the upper ends thereof bifurcated and adapted to pivotally receive the inner ends of manually operable levers 38 extending forwardly and outwardly therefrom through slots 39 formed in the forward wall of the casing 15 and between anti-friction guide rollers 40 mounted upon the outer side of said forward wall and are provided upon the outer ends thereof with handholds or grips 41. The manually operable levers 38 are provided and utilized to establish contact between the bus bars 24 and the spring pressed bars 26.

Mounted upon the block 19 contiguous to the base plates 28 and in longitudinally alignment therewith are posts 42 having the upper ends thereof bifurcated and adapted to pivotally receive the lower ends of upwardly extending latches or locking members 43 provided adjacent said lower ends and upon the inner edges thereof with notches or cutouts 44 having anti-friction rollers 45 associated therewith, and mounted thereat upon the sides of said latch members, adapted to restrainingly engage the forward terminals of the bus bars 24 to retain the latter in contact with the spring pressed bars 26, as indicated in full lines in Fig. 2.

The upper ends of the latch members 43 are adapted to be pivotally connected to the inner bifurcated ends of horizontally disposed link members 46, which extend forwardly and outwardly from said latch members through openings 47 formed in the forward wall of the casing 15 and are guided for reciprocative movement therethrough by anti-friction guide rollers 48 mounted upon the inner and outer sides thereof. Pivotally connected to the outer bifurcated ends of the link members 46 are actuating levers or handles 49 provided adjacent the inner ends and upon the undersides thereof with notches 50.

Extending forwardly from the casing 15 in prolongation to the bottom wall thereof and integrally or otherwise rigidly connected therewith is a plate 51 upon which are disposed in spaced relation clocks 52, 53 and 54, respectively, of any well known alarm type, adapted to actuate and control the bus bar switches 20, 21 and 22, respectively. The clocks and associated mechanism thereof are identical in construction and are fixedly secured in spaced relation upon the plate 51 by U shaped straps 55.

Rigidly secured upon the outer ends of the alarm winding stems 56 of the clocks 52, 53 and 54 for rotation therewith are upwardly and inwardly extending tripping levers 57 provided with notches 58 at the upper ends thereof adapted to receive and restrainingly engage the notches 50 of the actuating levers 49, as indicated in full lines Fig. 7.

Mounted upon the back walls of the clocks 52, 53 and 54 in spaced relation to the alarm winding stems 56 and in substantial vertical alignment therewith are outwardly projecting fixed posts 59 having stop pins 60 diametrically disposed and adjustably secured therein, adjacent the outer ends thereof, adapted to limit the rotary movement of the tripping levers 57, as shown in Fig. 7. The stop pins 60 are adjustably secured within the posts 59, as by clamping screws 61. Thus it will be seen that the alarm mechanisms are always wound up to a suitable tension and need only be wound up to the first catch to be again ready for action.

The clocks and associated mechanisms thereof are adapted to be enclosed by a hood 62 hingedly connected to the upper edge of the forward wall of the casing 15, as shown, and such hood is retained in a closed position by a spring pressed catch member 63, mounted within the lower portion of the forward wall thereof, restrainingly engaging a vertically disposed hook 64 rigidly secured to the forward portion of the plate 51. The catch member 63 is disengaged from the hook 64 by elevating a manually operable cam member 65 pivotally connected to the outer end of said catch member 63 and adapted to abut the exterior of the forward wall of the hood 62 during the elevation thereof, to thereby facilitate and expedite the retraction of the associated catch member 63 and the elevating of the hood 62, as will be obvious by referring to Fig. 2.

Fixedly mounted in one of the side walls of the casing 15 adjacent the upper rear portion thereof is a sleeve 66, of insulating material, through which the main circuit wires 67 and 68 enter said casing and are connected at the inner terminals thereof to a fuse block 69 rigidly secured upon the interior face of said side wall. Similarly secured in spaced relation upon the rear wall of the casing 15 adjacent the upper portion thereof are switches 70, 71 and 72, respectively, and a rheostat 73. Fixedly mounted in the opposite side wall of the casing 15 in alignment with the sleeve 66 is a similar sleeve 74, of insulating material, through which the controlled circuit wires 75 and 76 lead out from said casing. The several circuit wires and switches are connected to the bus bar switches 20, 21 and 22 in a manner hereinafter set forth.

In Fig. 9 I have illustrated the terminals of one of the bus bar switches equipped with magnetic blow out coils 77, whereby arcing or flashing thereat is eliminated during breaking of contact.

In Fig. 10 I have illustrated diagrammatically the wiring of the circuit control apparatus, wherein the main circuit wire 67 is connected by a lead or wire 78, through a fuse 69$^a$, to the central post 23 of the bus bar switch 20, and the main circuit wire 68 is connected by a lead 79, through a fuse 69$^b$, to the central post 23 of the bus bar switch 21. A lead 80 connects the base plate 28 of the bus bar switch 20 with one terminal of the switch 70, and a lead 81 connects the forked post 31 of said bus bar switch 20 with another terminal of the switch 70. The controlled circuit wire 75 is connected at the inner end thereof to the switch 70 and extends therefrom, as shown. A shunt 82 having the rheostat 73 interposed, in series, therein connects the controlled circuit wire 76 with the outer terminal of the switch 72.

A lead 83 connects the lead 79 with one terminal of the switch 71, and a lead 84 connects the base plate 28 of the bus bar switch 21 with another terminal of the switch 71. The controlled circuit wire 76 is connected at the inner end thereof to the switch 71 and extends therefrom, as shown.

The forked post 31 of the bus bar switch 21 is connected by a lead 85 to the central post 23 of the bus bar switch 22, and the base plate 28 of said bus bar switch is connected to the shunt 82 by a lead 86. A lead 87 connects the inner terminal of the switch 72 with the lead 85.

Connected in parallel with the controlled circuit wires 75 and 76 are a plurality of lamp circuits 88 having individual switches 89 interposed therein for individual control of said lamp circuits. The switches 89 may be mounted upon the casing 15 or in any convenient location desired.

The circuit control apparatus herein shown and described is especially adaptable for use and installation in poultry houses or buildings, wherein it is essential in order to obtain the maximum production and efficiency from the poultry to brightly illuminate the buildings for a certain period at night and following such period to provide for a period of dim or reduced illumination, after which such illumination is cut-off. The circuit control apparatus is also adaptable for use and installation in stores and other business houses in connection with the window and display lights thereof, whereby any desired lighting arrangement and effect may be obtained therefor. The present apparatus may also be used in homes in connection with the lighting systems thereof, whereby such homes may be automatically illuminated during the absence of the owners to thereby reduce the risk of the same being burglarized during such absence.

In the operation of the circuit control apparatus, as for example, assuming that the same is used in connection with a poultry house and complete automatic or triple switch control of bright and dim illumination is desired, the bus bars 24 are brought into contact with their respective spring pressed bars 26, by pulling the levers 38 forwardly and upwardly. Simultaneously with the forward upward movement of the levers 38 the actuating levers 49 are pushed inwardly to engage the latch members 43 with the bus bars 24, as indicated in full lines Figs. 2 and 10.

The alarm mechanisms of the clocks 52, 53 and 54 are then set for the hours or periods desired and the tripping levers 57 thereof are moved to the position indicated in full lines Figs. 2 and 7, whereupon the actuating levers 49 are dropped into the notches 58 of the levers 57 and engaged thereby, as shown. The off and on indicating pointers 90 of the clocks are then moved to the on position.

The switches 70, 71 and 72 and the rheostat are moved to the positions indicated in Fig. 10. The lamp circuits 88 are closed, or as many as may be deemed desirable and necessary, by manipulating the individual switches 89.

With the several elements of the apparatus disposed in the positions above described, it will be obvious, by referring to Fig. 10, that the associated controlled circuit wires 75 and 76 thereof are de-energized and open relative to the main circuit wires 67 and 68.

The alarm mechanism of the clock 52 is actuated at the hour set therefor, thereby rotating the tripping lever 57 thereof, which causes the actuating lever 49 in engagement therewith to move forwardly and upwardly and the interconnected link member 46 to move outwardly to release the associated latch member 43 from engagement with the bus bar 24 of the bus bar switch 20, whereupon the spring 35 functions in conjunction with the helical springs 29 and the spring pressed pin 34 to break contact between the bus bar 24 and the spring pressed bar 26 and to make contact between the blade 30 of said bus bar and the forked post 31, as indicated in dot and dash lines Fig. 2 and in dotted lines in Fig. 10.

With the bus bar 24 in the position above described current passes from the main circuit wire 67 through the lead 78, bus bar 24, of switch 20, lead 81, switch 70, controlled circuit wire 75 to the lamp circuits 88 and returns therefrom through the controlled circuit wire 76, switch 71, lead 84, bus bar 24 of switch 21 and lead 79 to the main circuit wire 68.

The alarm mechanism of the clock 53 is actuated at the hour set therefor, and the latch member 43 is released from engagement with the bus bar 24 of the switch 21, in an identical manner to that described for the bus bar switch 20, whereupon contact between said bus bar 24 and the associated spring pressed plate 26 thereof is broken, opening the circuit thereat, and closing the circuit again at the opposite terminal of the bus bar by making contact between the blade 30 of said bus bar and the associated forked post 31 thereof, as indicated in dotted lines Fig. 10, whereby the current flows through the shunt 82 and rheostat 73 dimming the illuminating lamps of the lamp circuits 88, due to the resistance set up by said rheostat, the current returns through the lead 86, bus bar 24 of the bus bar switch 22, lead 85, bus bar 24 of the bus bar switch 21 and lead 79 to the main circuit wire 68.

The alarm mechanism of the clock 54 is actuated at the hour set therefor, and the latch member 43 is released from engagement with the bus bar 24 of the bus bar switch 22, as hereinbefore described for the bus bar switch 20, whereupon contact between the said bus bar 24 and the associated spring pressed plate 26 thereof is broken, opening the circuit thereat and extinguishing the dimmed lamps of the lamp circuits 88.

For similar complete automatic operation the circuit control apparatus is again reset in a manner identical to that hereinbefore set forth.

In double switch control, using only the bus bar switches 20 and 21, the alarm mechanisms of the clocks 52 and 53 are set for the hours desired and the bus bar switches 20 and 21 and the associated mechanisms thereof are positioned, as hereinbefore described.

The switches 70 and 71 with the rheostat 73 remain in the positions indicated in full lines Fig. 10, while the switch 72 is closed as indicated in dotted lines therein.

When the bus bar switch 20 is released by the associated clock 52 the current passes to the lamp circuits 88 and returns therefrom in the same manner, as that described for triple switch control. When the bus bar switch 21 is released by the associated clock 53 the current passes through the lamp circuits 88, shunt 82 and rheostat 73 similar to that described, but, returns through the switch 72, lead 87, lead 85, bus bar 24 of the bus bar switch 21 and lead 79 to the main circuit wire 68. The circuit is manually broken and the dimmed lamps of the lamp circuits 88 extinguished by opening the switch 72.

In another method of double switch control especially adaptable for use with the lighting systems of stores and homes, using only the bus bar switches 20 and 21, the alarm mechanisms of the clocks 52 and 53 are set for the hours desired and the bus bar switches 20 and 21 and associated mechanisms thereof are positioned, as indicated in Fig. 10. The switches 70, 71 and 72 are disposed in the positions indicated in full lines in said figure.

When the bus bar switch 20 is released by the clock 52 the current passes to the lamp circuits 88 through lead 81 and switch 70 and returns therefrom through switch 71, lead 84, bus bar switch 21, and lead 79 to the main circuit wire 68. When the bus bar switch 21 is released by the clock 53 the circuit to the said lamp circuits is automatically opened and the lamps thereof extinguished.

In single switch control of the circuit disclosed in Fig. 10 utilizing only the bus bar switch 21 thereof, such switch is disposed in the full line position indicated and the alarm mechanism of the correlated clock 53 thereof set for the hour desired. The switches 70 and 71 remain in the full line positions shown and the switch 72 is closed, as indicated in dotted lines, whereat current passes through lead 81, and switch 70 to fully illuminate the lamps of the lamp circuits 88, and returns therefrom through the switch 71, lead 84, bus bar switch 21 and lead 79 to the main circuit wire 68.

When the bus bar switch 21 is released by the clock 53 the current passes through the shunt 82 and rheostat 73, dimming the lamps, and returns therefrom through the switch 72, lead 87, lead 85, bus bar 24 of the switch 21, and lead 79 to the main circuit wire 68. The circuit is manually broken and the dimmed lamps of the circuits 88 extinguished by opening the switch 72, or by moving the handle of the rheostat 73 to the off position indicated in dot and dash lines in Fig. 10.

In another method of single switch control, using the bus bar switch 20, the alarm mechanism of the clock 52 is set for the hour desired and the bus bar switch 20 and associated mechanisms thereof are positioned, as indicated in Fig. 10. The switch 70 is disposed in the position indicated in full lines in said figure and the switch 71 is moved to the position indicated in dotted lines therein.

When the bus bar switch 20 is released by the clock 52 the current passes through the lead 81, switch 70 to the lamp circuits 88 to illuminate the lamps thereof and returns therefrom through the lead 76, switch 71, lead 83 and lead 79 to the main circuit line 68. The circuit is manually broken by changing the position of either of the switches 70 or 71, as will be readily apparent.

In another method of single switch control, using the bus bar switch 20, the alarm mechanism of the clock 52 is set for the hour desired and the bus bar switch 20, and associated mechanisms thereof are positioned, as indicated in Fig. 10. The switches 70 and 71 are moved to the positions indicated in dotted lines in said figure, to close the circuit and fully illuminate the lamps of the lamp circuits 88. The current passes through the lead 80, switch 70 to the said lamp circuits and returns therefrom through switch 71, leads 83 and 79 to the main circuit wire 68.

When the bus bar switch 20 is released by the clock 52, the circuit is broken and the lamps of the lamp circuit 88 automatically extinguished.

In Fig. 11 I have shown the bus bar switches 20 and 21 of the circuit control apparatus having a flashing sign circuit incorporated therewith for automatic actuation thereby. The flashing sign circuit comprises a lead 91 connected at the inner end with the post 31 of the bus bar switch 20 and at the outer end thereof with a motor 92, said lead having a voltage regulator 93 interposed, in series, therein. Rigidly secured in spaced relation upon the motor shaft 94 for rotation therewith are make and break disks 95 and 96 respectively which contact upon one side thereof with the outer branch terminals of a lead 97 connected at the opposite or inner end thereof to the lead 91. Contacting with the opposite side of the disk 95 is a lead 98 and similarly contacting with the opposite side of the disk 96 is a lead 99.

A switch 100 selectively connects the leads 98 and 99 with a controlled circuit wire 101. A complementary or return controlled circuit wire 102 is connected to the motor 92 and extends outwardly therefrom.

A shunt 103 having a rheostat 104 interposed, in series, therein, connects the lead 99 with the circuit wire 101, while a lead 105 having a switch 106 interposed therein connects the circuit wire 101 with the base plate 28 of the bus bar switch 20, and similarly a lead 107 connects the circuit wire 102, with the base plate 28 of the bus bar switch 21.

Connected in parallel with the controlled circuit wires 101 and 102 are a plurality of flashing lamp circuits 108 having individual switches 109 interposed, in series, therein for individual control thereof.

In the operation of the flashing sign circuit, as for example, assuming that intermittent full and dim illumination is desired for the lamps of the lamp circuits 108, during the period of operation of said flashing sign circuit, the clocks 52 and 53 of the bus bar switches 20 and 21 are set for the hours between which it is desired to operate the said flashing sign circuit, the switches 20 and 21 and associated mechanisms are positioned as shown in full lines. The voltage regulator 93 is adjusted to obtain the desired motor speed, and the switches 100 and 106 with the rheostat 104 are disposed in the positions indicated in full lines, and the switches 109 of the lamp circuits 108 closed, as indicated in dotted lines. With the several elements disposed in the positions indicated and described the circuit of the apparatus remains open at post 31 of the bus bar switch 20. When the latter is released by the clock 52 to close the circuit at 31, the current flows through the lead 91 and voltage regulator 93 to the motor 92 rotating the same, the current also flows through the lead 97 to the make and break disks 95 and 96 and intermittently from the disk 95 through the lead 98, switch 100 to the controlled circuit wire 101, and similarly from the disk 96 through the shunt 103 and rheostat 104 to the said circuit wire 101, causing the lamps of the lamp circuits 108 to alternately flash bright and dim. The current returns through the lead 107, bus bar switch 21 and lead 79 to the main circuit wire 68. When the bus bar switch 21 is released by the clock 53 the circuit of the apparatus is opened at the base plate 28 of said bus bar switch 21, thereby automatically stopping the motor 92 and extinguishing the lamps of the lamp circuits 108.

By moving the switch 100 to the position indicated in dotted lines an automatically controlled flashing sign circuit having alternate light and dark periods is obtained, during the period of operation of said flashing sign circuit, and by moving the handle of the voltage regulator 93 to the off position, indicated in dot and dash lines and by closing the switch 106 an automatically controlled continuously illuminated sign circuit is obtained, during the period of operation of said sign circuit.

In Fig. 12 I have illustrated the method of incorporating the magnetic blow out coils 77 within the circuit of the apparatus, wherein the said coils are interposed, in series, within the leads 80 and 81.

While I have herein shown and described my invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of said construction may be resorted to without departing from the invention or the benefits derivable therefrom. I also desire to have it understood that certain features of the invention herein shown and described may be employed in other combinations than those herein shown.

Having thus fully described my invention, what I claim as new and desire to secure by Letters Patent of the United States is:—

1. In a circuit control apparatus, in combination, a controlled circuit, and means to automatically and successively energize said circuit with the maximum pressure and with a predetermined reduced pressure for predetermined periods and means to automatically de-energize said circuit.

2. In a circuit control apparatus, in combination, a controlled circuit, manually operable means to energize said circuit with the maximum pressure for a predetermined period, means to automatically reduce said pressure for a predetermined period in sequence to said first named period, and means to automatically de-energize said circuit at the termination of said last named period.

3. In a circuit control apparatus, in combination, an apparatus circuit, a controlled circuit connected therewith, manually operable means to energize said apparatus circuit for a predetermined period, means to automatically and intermittently energize said controlled circuit with the maximum pressure and with a reduced pressure, and means to automatically de-energize said circuits.

4. In a circuit control apparatus, in combination, an apparatus circuit, a controlled circuit connected therewith, means to predeterminately energize said apparatus circuit, means to automatically and intermittently energize said controlled circuit with the maximum pressure and with a reduced pressure, and manually operable means to de-energize said circuits.

5. In a circuit control apparatus, in combination, a controlled circuit, a plurality of separately operable switches connected therewith, and time controlled mechanisms to actuate said switches whereby said circuit is successively energized with the maximum pressure and with a reduced pressure for predetermined periods and at the termination thereof is de-energized.

6. In a circuit control apparatus, in combination, a controlled circuit, a plurality of separately operable switches connected therewith, and time controlled mechanisms to actuate said switches whereby said circuit is energized in time sequence with various degrees of pressure during a cycle of operation and at the termination thereof is de-energized.

7. In a circuit control apparatus, in combination, a controlled circuit, a manually operable switch connected therewith to energize said circuit with the maximum pressure, a time controlled mechanism to predeterminately actuate said switch whereby the pressure in said circuit is reduced a predetermined amount and means to de-energize said circuit.

8. In a circuit control apparatus, in combination, an apparatus circuit, a controlled circuit connected therewith, a control switch interposed in said apparatus circuit, time controlled mechanism to predeterminately actuate said switch, means interposed between said circuits to effect intermittent energization of the said controlled circuit with the maximum pressure and a predetermined reduced pressure upon actuation of said switch, and means to de-energize said circuits.

In testimony whereof I affix my signature.

FREEMAN T. WALTON.